March 14, 1967 W. T. VAN BUSKIRK 3,309,081

TABULATING CARD READER OUTPUT HOPPER STRUCTURE

Filed Feb. 11, 1965 3 Sheets-Sheet 1

INVENTOR.
WARREN T. VAN BUSKIRK
BY John A. Harvey
ATTORNEY

March 14, 1967 W. T. VAN BUSKIRK 3,309,081

TABULATING CARD READER OUTPUT HOPPER STRUCTURE

Filed Feb. 11, 1965 3 Sheets-Sheet 2

United States Patent Office 3,309,081
Patented Mar. 14, 1967

3,309,081
TABULATING CARD READER OUTPUT HOPPER STRUCTURE

Warren T. Van Buskirk, Rochester, N.Y., assignor to Friden, Inc., a corporation of Delaware Filed Feb. 11, 1965, Ser. No. 431,905
9 Claims. (Cl. 271—86)

The present invention relates to tabulating card readers. The invention more particularly relates to tabulating card readers which feed successive cards from an input card hopper, transport the cards edgewise through a reading zone to an output hopper, and at the reading zone sense columns of coded apertures representative of coded information items and convert the sensed apertures to corresponding coded electrical signals representative of the information items.

A tabulating card reader with which the output hopper structure of the present invention is useful is shown in the copending applications Ser. No. 431,904, entitled, "Tabulating Card Reader, Program Control Structure," by Edwin O. Blodgett, Ser. No. 431,859, entitled, "Tabulating Card Reader, Input Hopper Feed Structure," by Wilbur C. Ahrns, and Ser. No. 431,854, entitled, "Tabulating Card Reader, Card Drive Structure," by Edwin O. Blodgett, all filed on the same date as the present invention, Feb. 11, 1965, and all assigned to a common assignee with the present invention.

The tabulating card reader of the aforesaid copending applications is an improvement of the tabulating card reader disclosed in the copending application Ser. No. 249,228, of E. O. Blodgett, filed Jan. 3, 1963 and in the copending application Ser. No. 249,202, of Wilbur C. Ahrns, also filed on Jan. 3, 1963, both applications being assigned to the same assignee as the present application.

The pack of cards placed into the tabulating card reader input hopper, for reading by the aforesaid tabulating card reader of the Feb. 11, 1965, copending applications, is read, one card at a time, in a predetermined order off one face of the deck. It would be very desirable in a highly automated tabulating card reader such as that under discussion, to provide means for selectively ordering the deck of cards as collected by the output hopper in either the original input hopper order, or in reverse order. Such selectivity would obviate manual reordering, when reordering is desired, and additionally would save time. The operator could then retrieve the deck of cards from the output hopper in either the original or a reversed order, for storage, further processing, or the like.

It is an object of the present invention to provide a new and improved tabulating card reader, and one possessing the desirable operational characteristics enumerated above.

It is a further object of the invention to provide a novel tabulating card reader adapted to read cards selected from a deck or stack thereof, one at a time in predetermined order, and to reassemble the cards at an output hopper, one at a time, in either the original stacked order or in reversed stacked order, depending upon a predetermined setting of the apparatus of the invention.

It is an additional object of the invention to provide an improved tabulating card reader having utility in numerous and diverse applications as a source of data information rapidly and accurately presented in a wide variety of forms suitable for computation and documentation.

Other objects and advantages of the invention will appear as the detailed description thereof proceeds in the light of the drawings forming a part of this application, in which.

Figure 1:
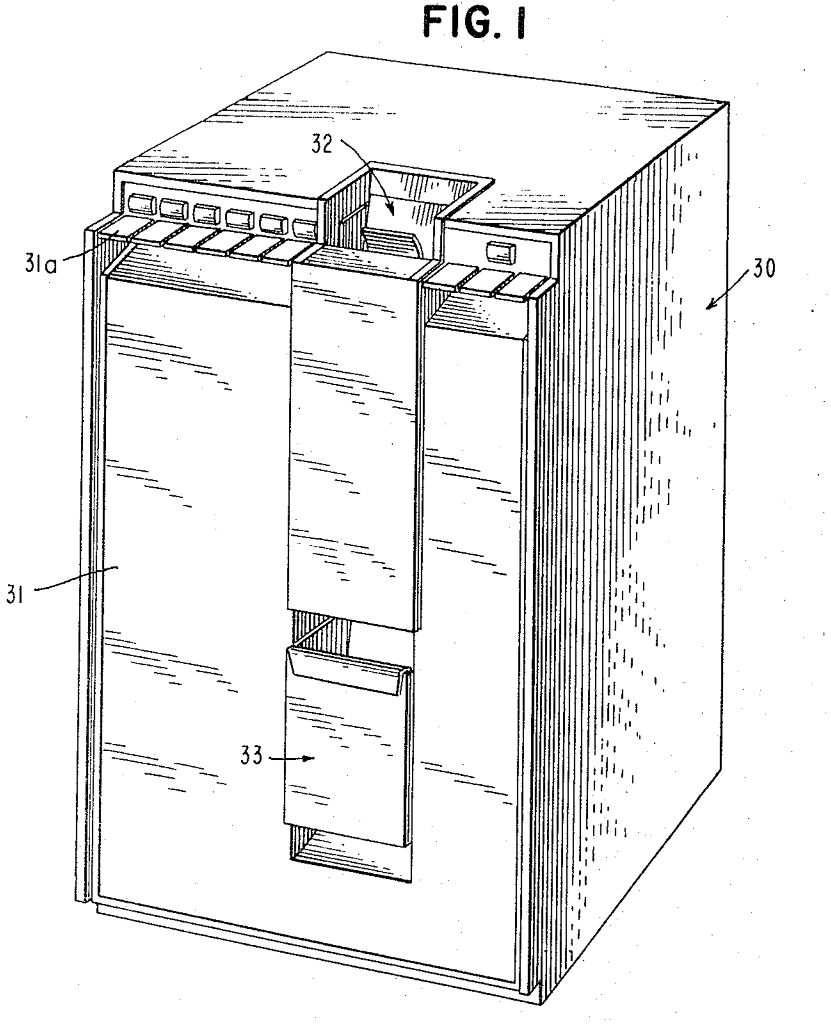
FIGURE 1 is a perspective view of a tabulating card reader embodying the present invention.
Figure 2:
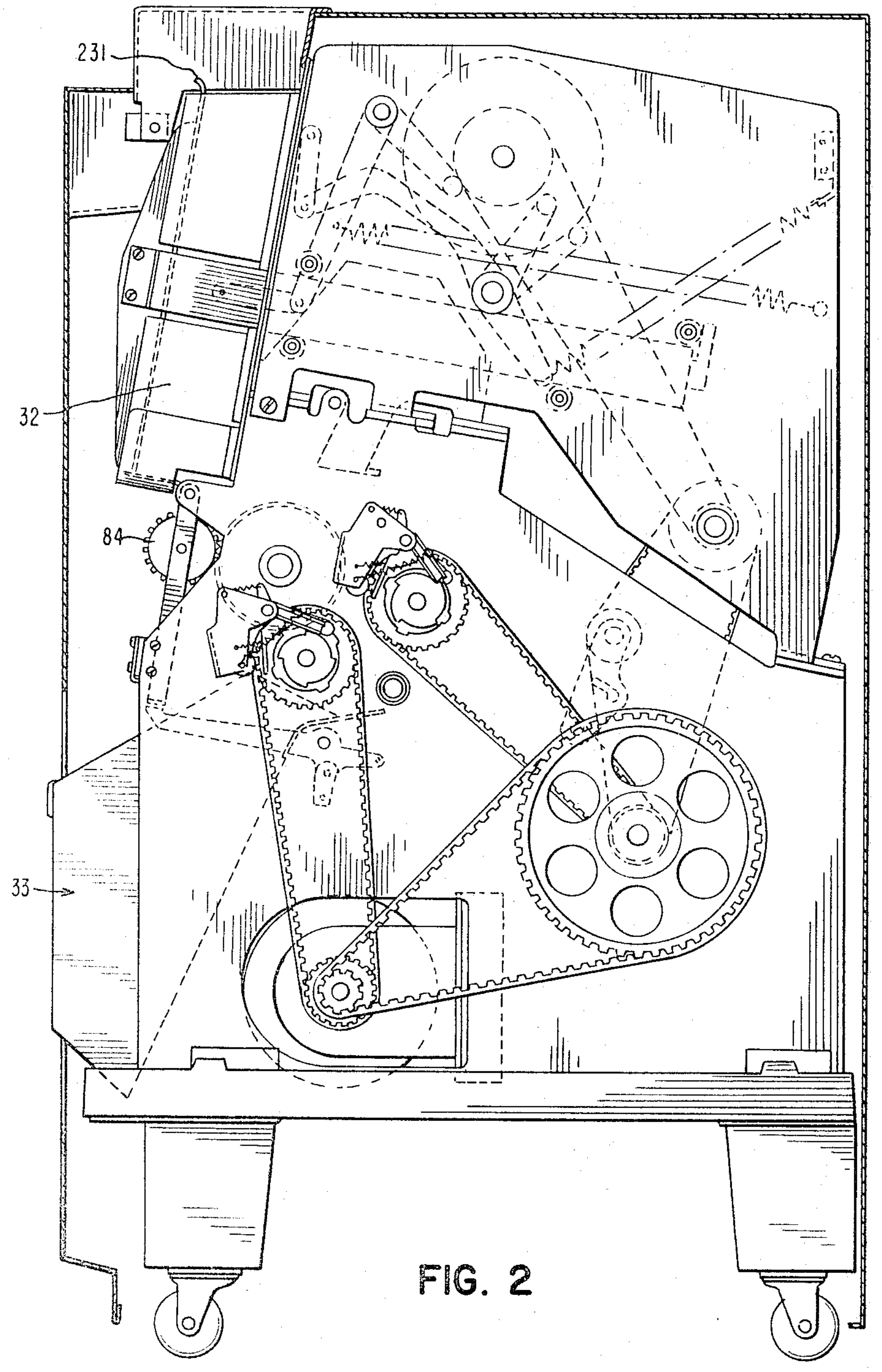
FIGURE 2 is an elevational interior view of the tabulating card reader shown in FIGURE 1.

Referring now to FIGURE 1, there is illustrated a tabulating card reader embodying the present invention in a particular form. The reader conveniently includes an outer console envelope 30 having a front panel 31 with an input tabulating card hopper 32 at the upper portion thereof and an output card hopper 33 at a lower portion thereof, all as shown in FIGURE 1, and supporting a series of control electrical switches **31*a*** useful in manually controlling the reader operation and the selection of various available card read programs.

Figure 3:
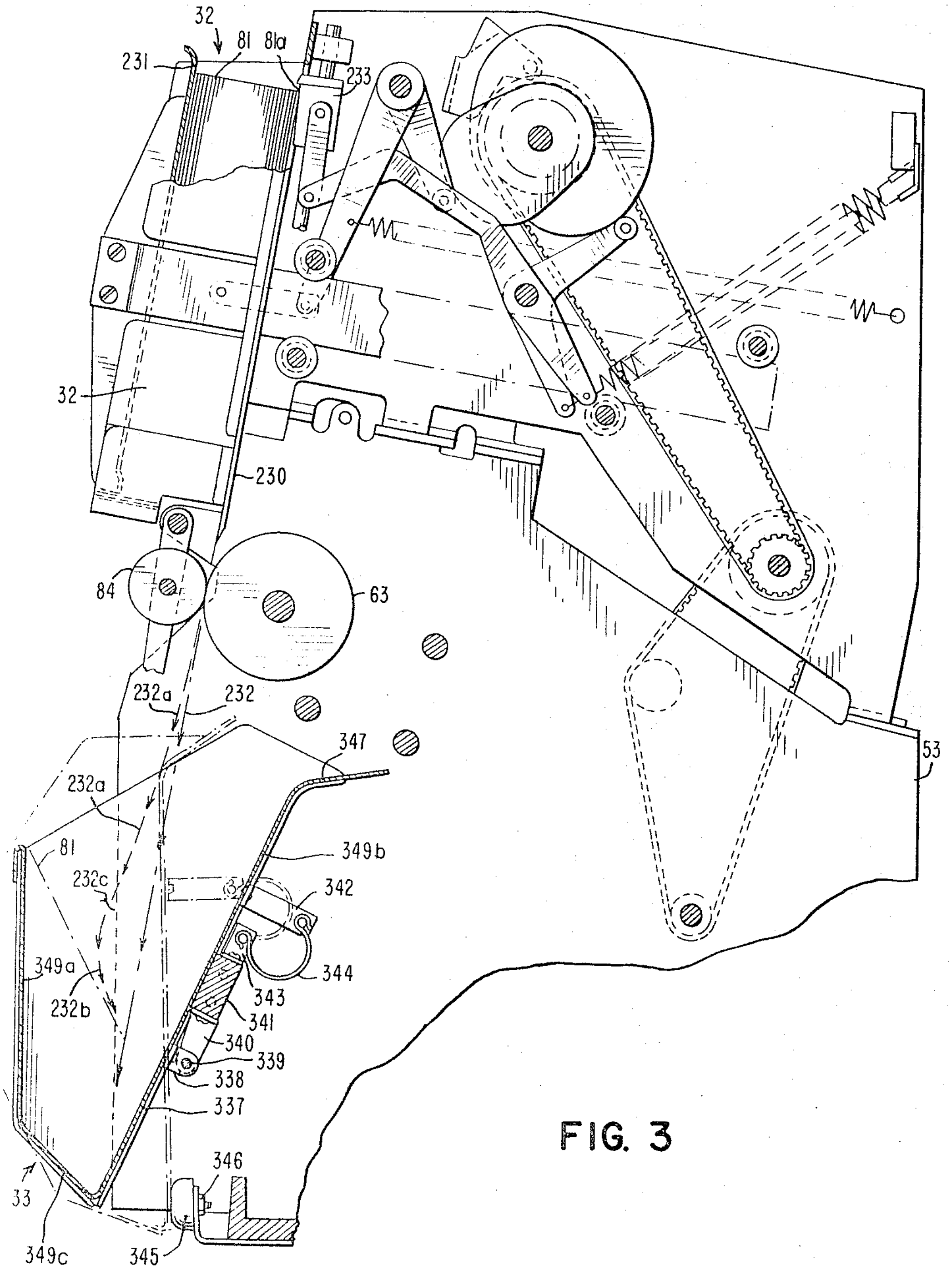
FIGURE 3 is a cross-sectional view of the tabulating card reader according to the invention showing the relationship of the various components associated with the input and output storage of the cards and the advancing of the cards therebetween.

Referring now additionally to FIGURE 3, the input hopper 32 is constructed to accommodate a pack of individual cards 81 between a back plate 230 and a pressure plate 231. The single example card **81*a* is drawn from the face of deck 81 adjacent to back-plate 230, and then travels from input hopper 32 downwardly to the "home" position between card driving discs 63 and spaced discs 84 and thence through the reading position and along the path indicated at 232 to the output hopper 33. Any card of deck 81 is designated herein as 81*a*** when it occupies the position illustrated in the figures with that designation.

As is best shown in full outline in FIGURE 3, output hopper 33 includes a bin enclosure 337 for receiving and stacking cards 81, one at a time. The function of bin 337 is to selectively stack cards 81 either in the original order of input hopper 32, or in reverse order, depending upon the orientation of bin 337, as hereinafter explained.

Bin enclosure 337 is generally V-shaped as between the front bin panel **349*a* and the rear bin panel 349*b*. That is to say, panels 349*a* and 349*b* mutually define an acute angle. The approach of panels 349*a* and 349*b* is truncated by skewed panel 349*c*, which forms an obtuse angle with panel 349*a* and an acute angle with panel 349*b*. At the uppermost portion of the rear bin panel 349*b* is a portion 347 slanted away from the enclosure of the bin, i.e. away from the space between panel 349*a* and panel 349*b***.

The bin enclosure 337 is pivoted at bracket 338 by pivot pin 339 to bracket 340 which is screwed to rail 341 extending between side plates 53 and a second side plate, not shown, parallel to and spaced from plate 53. The bin 337 is thus pivotable between a first or "in" position shown in full outline in FIGURE 3, and a second or "out" position shown in phantom outline. The first or "in" position automatically causes stacking of the cards in the original order, while the second or "out" position automatically causes stacking of the cards in the reverse order. A bracket 342 on bin 337 cooperates with a bracket 343 on rail 341 to capture a horseshoe-shaped off-center spring 344, so that bin 337 is stable in only the two positions shown, any position off-center tending to the nearest of those two positions under the urging of the off-center spring 344. A stop cushion 345 is secured to the reader frame by nut 346, so as to quiet pivoting toward the phantom outline position.

The bin panel **349*a* and the bin panel 349*b* are arranged relative to the pivoting mechanism just described, so that when bin 337 is in the first or "in" position shown in full outline, panel 349*a* is approximately vertical while panel 349*b* is slanted backward (relative to the front of the reader). When the bin 337 is pivoted to the second or "out" position shown in phantom outline, panel 349*a* is slanted forward and panel 349*b*** is approximately vertical (preferably very slightly slanted forward, as shown).

The line of arrowheads 232 in FIGURE 3 indicates the free path of a card 81*a*. The length of each card 81*a* is such that rollers 63, 84, drive it positively a major portion of the way along the line 232, and only a minor portion of the way does the card free fall, after it has left the nip of rollers 63, 84. The line 232 also represents the path of the first few cards 81*a* driven into bin 337 when the bin is in the first or full outline position. It will readily be appreciated that the first card so driven will lie back against slanted rear panel 349*b*. Succeeding cards will lie, in order of arrival, atop this first card, so that the stack will be built up on rear panel 349*b*, in the original ouder of input hopper 32. As the stack grows in size, the incoming cards will be deflected by the stack, toward the bottom thereof, and the actual path will be deflected counter-clockwise slightly, at its lower portion, from the path 232 shown in FIGURE 3. The fact that rear panel 349*b* and the bottom panel 349*c* make an acute angle, helps the bottom of the first card to run flush against rear panel 349*b*, but more importantly, it helps the bottom of the later cards, the latest of which may have been deflected somewhat by the pack as aforesaid, to run flush against the deck. This helps to create a tighter deck, and consequently obviates possibilities of shuffling of the cards by accident.

When the bin is placed in the second or "out" position shown in phantom outline, the cards are deflected from their free path. The pivoting mechanism of the bin is such that in this position the panel portion 347 is interposed into the free path 232 of cards 81*a*. Consequently each card 81*a*, still held by the nip of rollers 63, 84, is bent past portion 347 into the path shown at 232*a*. The early cards 81*a* arriving at bin 337 are curved along path 232*a* past panel portion 347 and then straight down into bin 337 where they lay, one atop another, on front panel 349*a* which is slanted forward. This causes a reverse ordered stacking of cards 81*a*. In other words, the early cards are deflected by panel portion 347, but after passing that portion they travel straight within the bin 337. A break line 232*c* is shown in arrow line 231*a*, and after that point the arrows are curved toward back panel 349*b* as at 232*b*. The change from a mode wherein path 232*a* is carried straight to the bottom of bin 337, to a mode wherein path 232*a* is carried up to the break line then curved into a path 232*b*, occurs after a stack of cards 81 (shown in phantom outline) has built up on front panel 349*a*. It is thus a feature of the device, that when the stack 81 in the output hopper has grown thick, additional cards can be accepted, automatically to obviate any crowded tendency to flip or flutter in the bin 337 and create stacking difficulties. Specifically, after a stack 81 has built up, each card is curved at 232*b* because of the stack 81 in its way, and when the upper end of that card is released at the nip of rollers 63, 84, the top of the card snaps over against the stack 81, i.e. the top of the card follows the bottom thereof down along the stack 81. Thus, the arrangement is such that even with a large stack, the later cards are automatically assured of being correctly stacked.

In general, the V-shaped bin 337 allows stacking of the cards at output hopper 33 in the original or the reverse positions, depending upon the orientation of bin 337. The truncated bottom 349*c* and the deflecting portion 347 serve to orient the incoming cards so that tight, correctly sequenced, stacks of cards are assembled without difficulties.

The operation of the tabulating card reader will now be considered with reference to the various components already described. The operator will place a deck of cards 81 into the input hopper 32 and will tilt bin 337 of output hopper 33 to the position shown in full outline in FIGURE 3, assuming he wants the output hopper 33 cards stacked in the order they occupied in input hopper 32. When the operator desires the output hopper

33 cards stacked in the reversed order, he will tilt bin 337 to the position shown in phantom outline in FIGURE 3.

The card 81*a* is positively pressured by pressure plate 231 while being positively driven by picker 233, but is not entirely removed from input hopper 32 prior to pick-up at driving discs 63. Rather, the card remains under the coordinated control of both the input hopper 32 parts and the driving discs 63 during reading. Thus, when the discs 63 intercept and begin to drive the card 81*a*, the pressure plate 231 is already in its pressure releasing phase and the card may be drawn further downward without slippage. However, during this takeover by discs 63 the upper portion of the card nevertheless remains slidably secured by back-plate 230, and other parts described in detail in the aforesaid copending applications of Feb. 11, 1965. This careful phasing of control of the progress of card 81 from the powered parts of hopper 32 (picker 233, pressure plate 231) to a combination of the powered parts at the reading station (discs 63) in conjunction with the passive parts at the hopper 32 (plate 230, plate 320, spring 319) assures that the progress of the card will be sure and synchronized and without jamming and the like. It is essential that the card 81*a* be pressured by plate 231 during at least a major portion of the distance it is driven by picker 233, and it is preferable that it be pressured until the aforesaid pickup thereof by discs 63.

The standard tabulating card records a maximum of 80 alpha-numeric characters, symbols, or functional control items of information by use of 80 index-point columns of the card. After reading the last index-point column of the card, the tabulating card 81*a* will have already been driven partway into output hopper 33 by rollers 63, 84 during the preceding reading process and thereupon other parts cooperate to release the tabulating card 81*a* from the nip of rollers 63, 84, described in detail in the copending applications of Feb. 11, 1965, and the card 81 then drops under gravity the rest of the way along one of the paths already described, depending upon the position of bin 337, as illustrated in FIGURE 3.

While a specific form of the invention has been described for purposes of illustration, it is contemplated that numerous changes may be made without departing from the spirit of the invention.

What is claimed is:

1. A hopper for receiving tabulating cards fed successively from above and stacking the said cards selectively into either of two orders, each of said orders being the reverse of the other, comprising an upwardly open bin having a first panel and a second panel arranged into a general V-shape; means for maintaining said bin in either of two positions, a first said position being defined by said first panel being approximately vertical and said second panel being slanted, and a second said position being defined by said second panel being approximately vertical and said front panel being slanted, said cards being normally directed edgewise in a downward direction which, when said bin is in said first position, is toward said second panel; and means adjacent the top portion of said bin adapted to intercept and deflect said cards toward said front panel when said bin is in said second position.

2. A hopper according to claim 1 wherein said bin is truncated at its bottom portion.

3. A hopper according to claim 1 wherein said bin is truncated at the bottom portion thereof by a bottom panel forming an obtuse angle with said first panel and an acute angle with said second panel.

4. A hopper for receiving tabulating cards fed successively from above and stacking the said cards selectively into either of two orders, each of said orders being the reverse of the other, comprising an upwardly open bin having a front panel and a rear panel arranged into a general V-shape, the upper portion of said rear panel including a deflection member; and means for maintaining said bin in either of two positions, a first said position being defined by said front panel being approximately vertical and said rear panel being slanted rearward, said cards being normally directed edgewise in a downward direction which, when said bin is in said first position, is toward said rear panel for stacking thereagainst in a first of said two orders, and a second said position being defined by said rear panel being approximately vertical and said front panel being slanted forwardly, so that said deflection member is interposed into the downward path of said cards so as to deflect them forwardly toward said front panel for stacking thereagainst in a second of said two orders.

5. A hopper according to claim 4 wherein said deflection member comprises a portion of said rear panel slanted relative thereto.

6. A hopper according to claim 4 wherein said bin is pivoted for movement between said two positions, and spring loaded so as to be stable only at said two positions.

7. A hopper according to claim 4 wherein said bin is truncated at its bottom portion.

8. A hopper according to claim 4 wherein said bin is truncated at the bottom portion thereof by a bottom panel forming an obtuse angle with said front panel and an acute angle with said rear panel.

9. A hopper according to claim 4 wherein when said cards are directed at said front or rear panels, the direction of approach thereto describes an acute angle with the panel.

References Cited by the Examiner

FOREIGN PATENTS 696,069 8/1953 Great Britain.

M. HENSON WOOD, Jr., *Primary Examiner.*

R. A. SCHACHER, *Assistant Examiner.*